United States Patent [19]

Kynsilehto et al.

[11] Patent Number: 5,590,522
[45] Date of Patent: Jan. 7, 1997

[54] CATALYTIC COMBUSTION ENGINE EXHAUST GAS PURIFIER WITH ADDITIONAL AIR SUPPLY

[75] Inventors: Eero Kynsilehto, Kiiminki; Eero Aitta, Jokirinne, both of Finland

[73] Assignee: Finn Katalyt Oy, Oulu, Finland

[21] Appl. No.: 343,430

[22] PCT Filed: May 24, 1993

[86] PCT No.: PCT/FI93/00217

§ 371 Date: Jan. 31, 1995

§ 102(e) Date: Jan. 31, 1995

[87] PCT Pub. No.: WO93/24745

PCT Pub. Date: Dec. 9, 1993

[30] Foreign Application Priority Data

May 25, 1992 [FI] Finland .................................. 922384

[51] Int. Cl.6 .................................. F01N 3/28; F01N 3/34
[52] U.S. Cl. .................................. 60/299; 60/308; 422/176; 422/180
[58] Field of Search .................. 60/299, 308; 422/176, 422/180

[56] References Cited

FOREIGN PATENT DOCUMENTS

| | | |
|---|---|---|
| 408910 | 1/1991 | European Pat. Off. . |
| 2608843 | 9/1977 | Germany . |
| 1334810 | 10/1973 | United Kingdom . |
| 2048706 | 12/1980 | United Kingdom . |

Primary Examiner—Douglas Hart
Attorney, Agent, or Firm—Ladas & Parry

[57] ABSTRACT

The invention relates to a catalytic combustion engine exhaust gas purifier with additional air supply. The exhaust gas purifier comprises a housing structure (1) accommodating an exhaust gas inlet (2), at least one catalyst element (3), means (4) for laminarizing the exhaust gas flow, means (5 and 6) for dividing the housing structure (1) into several chambers (7–9), an exhaust gas outlet (10) and, additionally, means (11) for supplying additional air (17 and 18) into the exhaust gas flow (14 and 15) in the housing structure (1). One or more suction plates (19 and 20) are provided in the chamber (8) after the means (4) laminarizing the exhaust gas flow and at the same time in the vicinity of the means (11) supplying additional air. The suction plates (19 and 20) comprise exhaust gas ports and additional air (17 and 18) ports, and the suction plates (19 and 20) are arranged against the exhaust gas flow (14 and 15) and the additional air flow (17 and 18) so that the additional air is arranged to be sucked through the additional air ports and from the suction plates (19 and 20) into the exhaust gas flow (15) passing through the exhaust gas ports of the suction plates (19 and 20).

7 Claims, 4 Drawing Sheets

WITH FULL LOAD

WITH FULL LOAD

CATALYTIC COMBUSTION ENGINE EXHAUST GAS PURIFIER WITH ADDITIONAL AIR SUPPLY

The invention relates to a catalytic combustion engine exhaust gas purifier with additional air supply, comprising a housing structure accommodating an exhaust gas inlet, at least one catalyst element, means for laminarizing the exhaust gas flow, means for dividing the housing structure into several chambers, an exhaust gas outlet and, additionally, means for supplying additional air into the exhaust gas flow in the housing structure.

An exhaust gas purifier according to the present invention is used in connection with combustion engines. The exhaust gas purifier of the invention is particularly suitable for small two-stroke engines, such as chain saws, lawn mowers, motor sledges, mopeds or motor cycles, in which there is only a very small and limited space for an exhaust gas purifier.

Catalytic exhaust gas purification is based on the purification of the exhaust gas by feeding it through one or more catalyst elements. The catalyst elements contain a catalytic agent which accelerates the combustion of harmful impurities, i.e. in practice it makes combustion possible at a temperature lower than normal. Today purification of exhaust gases is important especially for preventing environmental pollution. Conventional catalytic purifiers have problems with sufficiency of oxygen, because, if there is not enough oxygen, carbon monoxide produced as a combustion product of hydrocarbon is not further oxidized into carbon dioxide owing to the lack of oxygen. As carbon monoxide has no smell and is colourless, it is hazardous to its environment and especially to people. In order to improve the efficiency of catalytic purification it is previously known to use exhaust gas purifiers into which additional air is supplied from the outside, and thus the oxygen contained in the additional air accelerates the combustion reactions by means of which a faster and more complete combustion of the principal pollutant components of exhaust gas, i.e. carbon monoxide (CO) and hydrocarbons (HC), is achieved. Catalytic exhaust gas purifiers provided with additional air supply are called oxidizing purifiers.

GB Patent 2 048 706 discloses a catalytic purifier provided with additional air supply. In this construction additional air supply has been improved so that the tube supplying additional air extends inside the purifier from one edge of the purifier to the other, said tube comprising several holes for mixing the additional air with the exhaust gas. This construction does not, however, enable a sufficiently good purification result and, in addition, the air supply requires in this case an external device such as a pump or a corresponding device. DE Patent 31 11 498 discloses a so called venturi-type additional air supply, in which a venturi choking or reducing the exhaust gas flow and valves in the additional air supply tube are used for controlling the additional air flow. On account of the valves this construction is more complex and hence more expensive and also more susceptible to malfunctions because of its moving parts. Because of the choking effect of the venturi, an exhaust gas purifier of this kind causes power losses and does not laminarize the exhaust gas flow. The known solutions for additional air supply are also sizable.

The object of the present invention is to provide a new type of exhaust gas purifier which avoids the problems associated with the known solutions.

This object is achieved with the exhaust gas purifier according to the invention, which is characterized in that one or more suction plates are provided in the chamber after the means laminarizing the exhaust gas flow and at the same time in the vicinity of the means supplying additional air, that the suction plates comprise exhaust gas ports, that the suction plates comprise ports for the additional air, and that the suction plates are arranged against the exhaust gas flow and the additional air flow so that the additional air can be sucked through the ports and from the suction plates into the actual exhaust gas flow passing through the exhaust gas ports of the suction plates.

The exhaust gas purifier according to the invention is based on the idea that the exhaust gas purifier comprises means, i.e. one or more suction plates arranged in the chamber, by means of which suction plates it is possible to control the amount of additional air and the capacity of the exhaust gas flow to suck additional air.

Several advantages are achieved with the exhaust gas purifier according to the invention. By means of the suction plates provided in the chamber, effective suction of additional air into the exhaust gas flow is achieved with a small construction. The construction does not comprise any moving parts, wherefore the construction is cheap to produce and reliable in operation. Because of the effective suction of additional air, the impurities in the exhaust gas will oxidize more completely into carbon dioxide. In the solution according to the invention the exhaust gas flow is not choked, but the exhaust gas flow is laminarized, whereby the engine does not suffer from power losses. The use of the suction plates also evens out the pulsation of the exhaust gases, whereby a reduced running noise level of the engine is achieved.

The invention will be more closely described in the following with reference to the accompanying drawings, in which FIG. 1 is an internal schematic view of a construction according to a first embodiment of the exhaust gas purifier, FIG. 2a is a schematic view of a chamber plate, FIGS. 2b–2d are schematic views of a suction plate, FIG. 3 is a cross-section at the arrows A—A of FIG. 1, FIG. 4 is a cross-section at the arrows B—B of FIG. 1, FIG. 5 is an internal schematic view of a construction according to a second embodiment of the exhaust gas purifier, FIG. 6 is a cross-section at the arrows C—C of FIG. 5, FIG. 7 shows the CO content vs. the number of revolutions per minute without load, FIG. 8 shows the HC content vs. the number of revolutions per minute without load, FIG. 9 shows the HC content vs. the number of revolutions per minute with full load, FIG. 10 shows the CO content vs. the number of revolutions per minute with full load.

FIG. 1 is a schematic view of the internal construction of an exhaust gas purifier. The catalytic exhaust gas purifier according to the invention comprises a housing structure 1. The housing structure 1 accommodates the following parts: an exhaust gas inlet 2, at least one catalyst element 3, means 4 such as a tube for laminarizing the exhaust gas flow, means such as chamber plates 5 and 6 for dividing the housing structure 1 into several chambers 7–9. Furthermore, in the housing structure 1 are arranged, i.e. the housing structure 1 accommodates, an exhaust gas outlet 10 and also means 11 such as an inlet for supplying additional air into the housing structure 1, into the exhaust gas flow in at least one chamber. The exhaust gas flow is indicated by the arrows 12–16 in various positions of the exhaust gas purifier. The additional air flow is indicated by the arrows 17 and 18. The purpose of the means 4, e.g. a tube, for laminarizing the exhaust gas is to streamline the exhaust gas flow. According to the invention one or more suction plates 19, 20 are arranged in the chamber 8 after the means 4 laminarizing the exhaust gas flow 14 and at the same time in the vicinity of the means 11 supplying additional air. FIG. 1 shows two successive suction plates, i.e. suction plates 19 and 20, after which the exhaust gas purifier comprises a hermetically attached, e.g. welded, second chamber plate 6. In the housing structure 1 the first chamber plate 5 is arranged upstream of the additional air inlet 11, i.e. around the means 4, preferably a tube, for laminarizing the exhaust gas flow. FIGS. 2b and 2c show the suction plates 19 and 20 shown also in FIG. 1. With reference to FIGS. 1, 2b and 2c the suction plates 19 and 20, according to the invention, further comprise exhaust gas ports 21a and 21b. The second chamber plate 6 shown in FIG. 2a comprises an exhaust gas port 21c. The exhaust gas ports 21a–21c shown in FIGS. 2a–2c are provided at the arrows 15 indicating the exhaust gas flow in FIG. 1. Furthermore, according to the invention, the suction plates 19 and 20 comprise ports 22a–22d for additional air and, additionally, according to the invention, the suction plates 19 and 20 are arranged against the exhaust gas flow 14, 15 and the additional air flow 17 and 18 so that the additional air can be sucked through the ports 22a–22d and through the suction plates 19 and 20 into the actual exhaust gas flow 15. The additional air ports 22a–22d in the suction plates 19 and 20 as shown in FIGS. 2b and 2c are provided in FIG. 1 at the points where the arrows 17 and 18 indicating the additional air flow penetrate the suction plates 19 and 20. The exhaust gas ports 21a and 21b do not necessarily have to be positioned in the suction plates 19 and 20 as shown in FIGS. 2b and 2c. Alternatively, the exhaust gas ports 21a and 21b can be openings between the actual suction plates 19 and 20 and the housing structure 1 and, likewise, the additional air ports 22a–22d can also be openings between the actual suction plates 19 and 20 and the housing structure 1. These alternative embodiments should, however, be seen as a construction embraced by the present invention, because it is essential for the operation of the ports that the exhaust gas and the additional air can be supplied via the ports either through the suction plate or past it. As regards the existence of the ports, the essential fact is that the ports are areas removed from the suction plates 19 and 20, such as holes according to FIGS. 2b–2d or, alternatively, the suction plates 19 and 20 have a broken edge, in which case the ports are formed between the actual suction plate 19 and 20 and the housing structure 1 or some other structure.

In a preferred embodiment of the invention in accordance with FIGS. 2b–2c the additional air ports 22a–22b in the suction plate 19 and the additional air ports 22c–22d in the suction plate 20 are arranged around the exhaust gas ports 21a and 21b, respectively. In this case it is possible to guide the additional air symmetrically around the exhaust gas ports 21a and 21b provided closer to the centre of the suction plate, and thus the exhaust gas flow can more effectively suck the additional air with it.

In a preferred embodiment of the invention with reference to FIGS. 2b–2c the additional air ports of the successive suction plates 19 and 20 in FIG. 1 are provided at dissimilar positions in the flow direction, i.e. not in line. This means that the additional air ports 22c and 22d of the second suction plate 20 do not follow directly after the additional air ports 22a and 22b of the first suction plate 19. This also improves the capacity of the suction plates 19 and 20 to prevent the harmful back flow, because the back flow cannot move directly backwards.

In a preferred embodiment of the invention the size of the exhaust gas ports 21a and 21b of the suction plates 19 and 20 is chosen so that the size of the ports increases in the flow direction, i.e. the port 21b of the second suction plate 20 is larger than the port 21a of the first suction plate 19, because with an increasing number of suction plates the amount of air increases, and thus it is easier to include the increasing amount of air in the exhaust gas ports 21a and 21b. As stated above, the second chamber plate 6 positioned after the last actual suction plate 20 and shown in FIGS. 1 and 2a is also preferably such that the exhaust gas port 21c contained in it is larger than the ports in the suction plates 19 and 20 positioned before the chamber plate. The applicants have found that a suitable way of dimensioning the exhaust gas ports 21a–21c is such that the size of the exhaust gas ports 21a–21c increases from the 20 millimetres of the suction plate 19 with an increment of one millimetre to the 22 millimetres of the second chamber plate 6. In FIGS. 2a–2c the size or diameter of the ports is indicated by the arrows D, E and F, of which D is the shortest, i.e. 20 mm, and F the longest, i.e. 22 mm.

According to a preferred embodiment of the invention the suction plate 23 shown in FIG. 2d is such that the port of the suction plate 23 has a configuration 24 increasing the length of the edge of the port 21d. It can be seen from FIG. 2d that the uneven edge configuration provides considerably more edge length than the round edge shown in FIGS. 2b–2c. By lengthening the edge of the exhaust gas port 21d of the suction plate 23 the suction of the additional air into the exhaust gas flow 15 is improved, because in practice the suction plate then has more edge length at which the additional air leaves the suction plate and is sucked into the exhaust gas flow.

FIG. 4 shows a cross-section of the housing structure 1 at the arrows B—B of FIG. 1. FIG. 4 shows more clearly one preferred embodiment for positioning the means 4 laminarizing the exhaust gas flow. In FIGS. 1 and 4 the means for laminarizing the exhaust gas flow is arranged inside a first catalyst element, i.e. in practice the catalyst element 3 is arranged around the tube 4. This construction increases the likelihood of achieving a small exhaust gas purifier.

With reference to FIG. 1 the housing structure 1 is divided by means of chamber plates into several chambers so that the chamber plates 5 and 6 divide the housing structure at least into three chambers 79. The first chamber plate 5 and the housing structure define a first chamber 7, which is a chamber into which the exhaust gas is supplied from an exhaust gas inlet. A second chamber 8 is a space defined by the housing structure and the first chamber plate 5 and the second chamber plate 6. The second chamber 8 is specifically the chamber into which the means, such as a tube 4, for laminarizing the exhaust gas flow directs the exhaust gas flow 14. Additional air supply is also provided in this second chamber 8 and, moreover, the suction plates 19 and 20 are also arranged in the same chamber. A third chamber 9 is provided by a space between the second chamber plate 6 and the housing structure. An essential feature of the invention is to arrange one or more suction plates against the flow of exhaust gas and additional air in the brief space of the chamber 8 after the means 4 laminarizing the exhaust gas flow.

The points indicated by the reference numeral 50 in FIGS. 2a–2d are spot welds by means of which the suction plates and chamber plates can be attached to the housing structure.

FIG. 3 illustrates a cross-section at the arrows A—A in FIG. 1. With reference to FIGS. 1 and 3 a second catalyst element 25 is arranged in the third chamber 9 of the housing structure 1. The object of the present invention mainly relates to mechanical implementation of an exhaust gas purifier and not primarily to catalyst elements and chemical reactions occurring in them. On account of the above it is briefly stated that the catalyst elements 3 and 25 are of a type known per se, i.e. catalyst cells which comprise for example a ceramic or metallic support cell structure and an intermediate layer provided thereon and comprising accelerators for chemical reactions. For example an intermediate layer of aluminium oxide is coated with a mixture of precious metals, e.g. a mixture of platinum and rhodium. In the first chamber 7 containing the first catalyst 3, the hydrocarbons (HC) are oxidized into carbon dioxide ($CO_2$), carbon monoxide (CO) and water ($H_2O$), if there is not enough oxygen present. Thus the exhaust gas will contain harmful carbon monoxide (CO).

In the following the operation of the exhaust gas purifier of the invention will be described with reference to FIGS. 1 to 4. The exhaust gas is supplied from the engine (not shown) through the exhaust gas inlet 2 into the first chamber 7 in the housing structure 1. The exhaust gas flow 12 passes through the first catalyst element 3, after which the exhaust gas flow 13 is diverted at the end of the chamber 7 into the tube 4 laminarizing the exhaust gas flow. While passing through the tube 4 the exhaust gas flow 14 is laminarized. The tube 4 directs the laminar exhaust gas flow into the second chamber 8 in which the suction plates 19 and 20 are arranged. The simplest means for supplying additional air is an additional air inlet 11 arranged in connection with the second chamber 8. The suction plates 19 and 20 are arranged in the vicinity of both the additional air supplying means 11 and the tube 4, for laminarizing the exhaust gas. The additional air flow 17 and 18 passes to the first suction plate 19 and penetrates it through the additional air inlets 22a and 22b provided in the suction plate 19, and thus the additional air enters the area between the first suction plate 19 and the second suction plate 20. Part of the additional air flow 17 and 18 is sucked from the edge of the exhaust gas port 21a of the first suction plate 19 with the pulsation of the laminar exhaust gas flow 15. The exhaust gas flow is directed by means of the tube laminarizing the exhaust gas flow to the exhaust gas port 21a positioned in the middle of the first suction plate 19. Part of the additional air flow 17 and 18 passes forwards in the longitudinal direction of the housing structure 1 and penetrates the second suction plate 20 through the additional air ports 22c and 22d, and thus the additional air flow passes between the second suction plate 20 and the second chamber plate 6, wherefrom the additional air is sucked with the pulsation of the exhaust gas flow 15. Thereafter the exhaust gas flow containing additional air passes to the third chamber 9 in which a second catalyst cell 25 is arranged. In the third chamber 9 the carbon monoxide (CO) still remaining in the exhaust gas is oxidized into carbon dioxide on account of the additional oxygen from the additional air. In a preferred embodiment of the invention the second catalyst element 25 is positioned at a suitable distance from the second chamber plate 6 in order for the exhaust gas flow to be able to spread all over the cross-sectional area of the catalyst element 25. The purified exhaust gas flow 16 is removed from the housing structure through an outlet 10. The exhaust gas 15 exhibits a sinusoidal pulsation in conformity with the running of the combustion engine. The applicants have found that the suction plate—chamber construction according to the invention enables the additional air to effectively fill the low-amplitude portions of the pulsation of the exhaust gas.

FIG. 5 is an internal schematic view of a construction according to a second embodiment of the exhaust gas purifier, the major difference to the solution according to FIG. 1 being the manner of supplying the additional air to the suction plates. The construction and operation shown in FIG. 5 are in principle nearly similar to those in the embodiment of FIG. 1, and in this connection reference is made to the above-described construction and operational principle. As shown in FIG. 5, the exhaust gas purifier according to the second embodiment comprises a housing structure 101 accommodating an exhaust gas inlet 102, at least one catalyst element 103, means 104 for laminarizing the exhaust gas flow, means 105 and 106, such as chamber plates, for dividing the housing structure into several chambers 108–109, an exhaust gas outlet 110 and, additionally, means 111 for supplying additional air into the exhaust gas flow in the housing structure, which last-mentioned means in this preferred embodiment of the invention is a means 111 supplying additional air and being a flow space provided at the surface area of the housing structure. The flow space 111 extends advantageously over a considerable part of the surface area of the housing structure 101 and advantageously in such a way that the flow space 111 surrounds a considerable part of the housing structure, and preferably in accordance with FIGS. 5 and 6 so that the flow space 111 is arranged at the surface area of the housing structure so that it essentially surrounds the whole housing structure. This construction enables the additional air to be used for cooling the housing structure 101. FIG. 6 shows a tube 104 intended for laminarizing the exhaust gas flow, a catalyst element 103 arranged around it, and a flow space 111 between the catalyst element 103 and the housing structure 101, which flow space provides a means for supplying additional air.

As in FIG. 1, the exhaust gas purifier according to FIG. 5 also comprises similar structures with the exception that there are three suction plates, i.e. suction plates 119, 120 and 121. The suction plates and the second chamber plate 106 comprise exhaust gas ports, which are positioned at the arrow 115 indicating the exhaust gas flow. The suction plates 119–121 also comprise additional air ports, which are positioned at the arrows 130 and 131. The second chamber plate 106 also comprises an exhaust gas port 121c. Correspondingly, a second catalyst element 125 is arranged in the third chamber 109. The essence of FIGS. 5 and 6 is, however, the structure by means of which the additional air flow 117 and 118 is brought through the elongated flow space 111 to the suction plates 119–121 in the longitudinal direction of the housing structure 101.

FIGS. 7–9 show test results on the efficiency of purification of the exhaust gas purifier according to the invention measured on a two-stroke lawn mower. In all FIGS. 7–9 the uppermost graph represents the exhaust gas from the engine, measured at the measuring point H shown in FIG. 1. In all FIGS. 7–9 the middle graph represents the purified exhaust gas, measured at the measuring point J shown in FIG. 1, but with no supply of additional air. In all FIGS. 7–9 the lowermost graph represents the purified exhaust gas, measured at the measuring point J shown in FIG. 1, but with supply of additional air into the exhaust gas.

Figure 1:
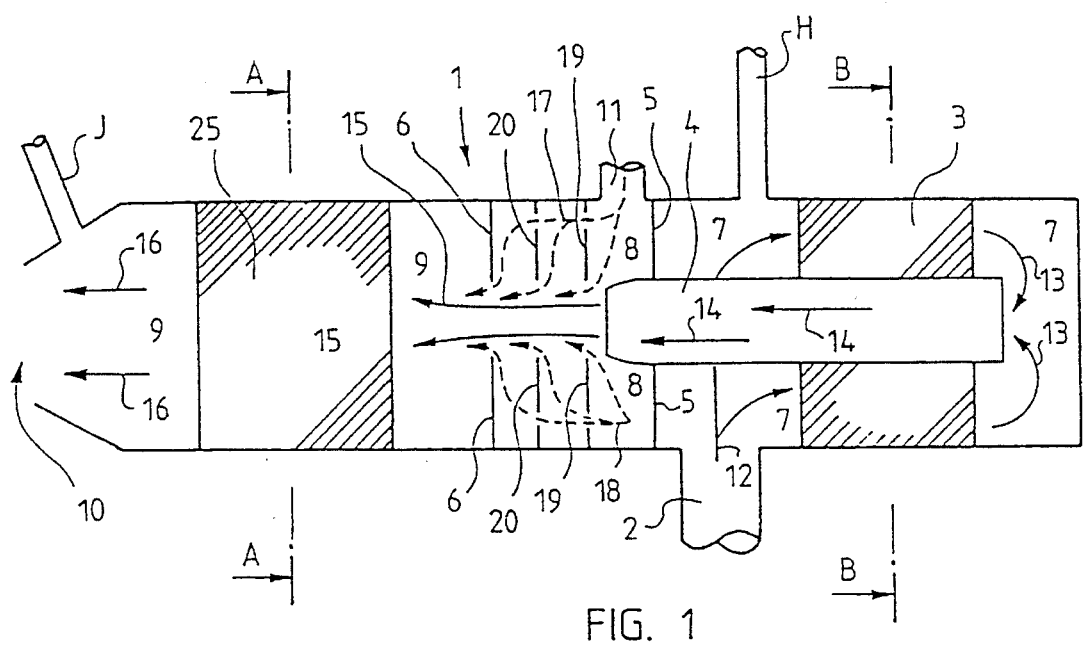
Figure 2A:
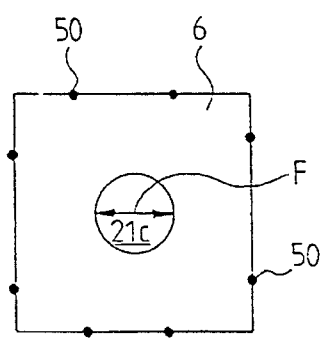
Figure 2B:
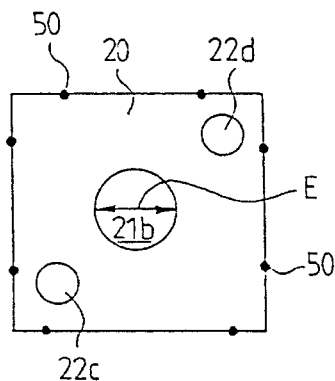
Figure 2C:
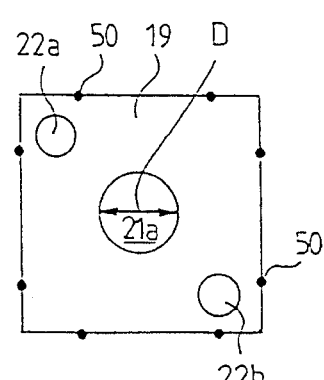
Figure 2D:
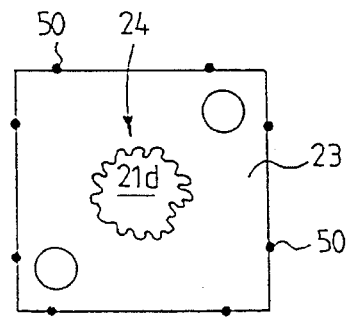
Figure 3:
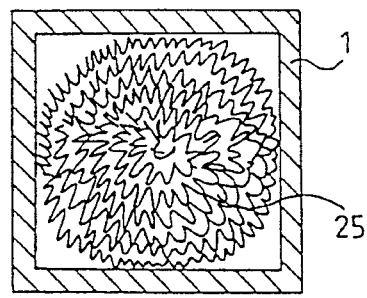
Figure 4:
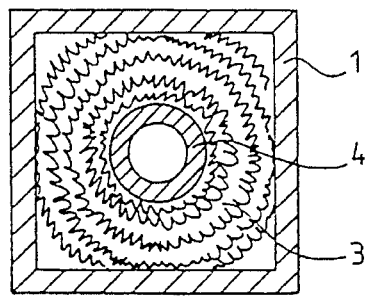
Figure 5:
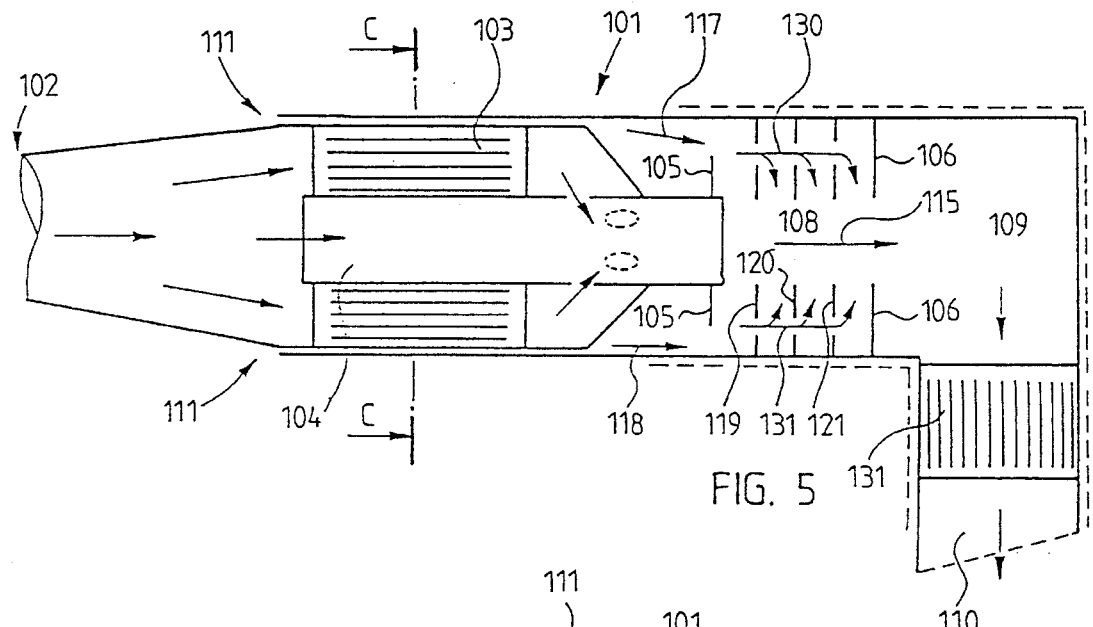
Figure 6:
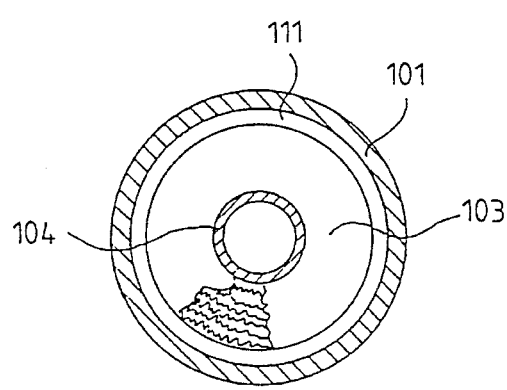
Figure 7:
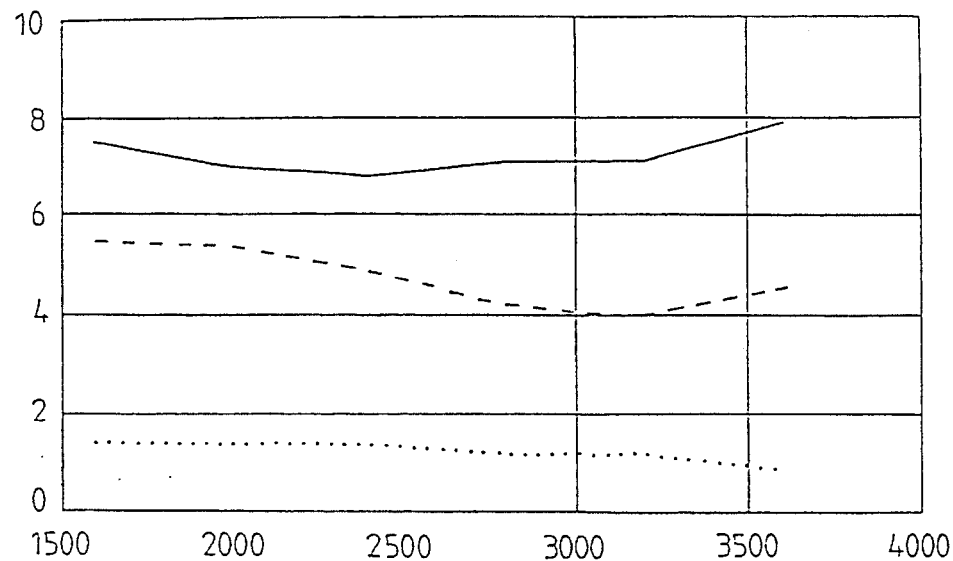
FIG. 7 shows the CO content measured without load vs. the number of revolutions per minute (rpm) of the engine. It can be seen from FIG. 7 that the CO content, i.e. the carbon monoxide content, decreases to one fourth in the absence of additional air supply as compared with the case of additional air supply.
Figure 8:
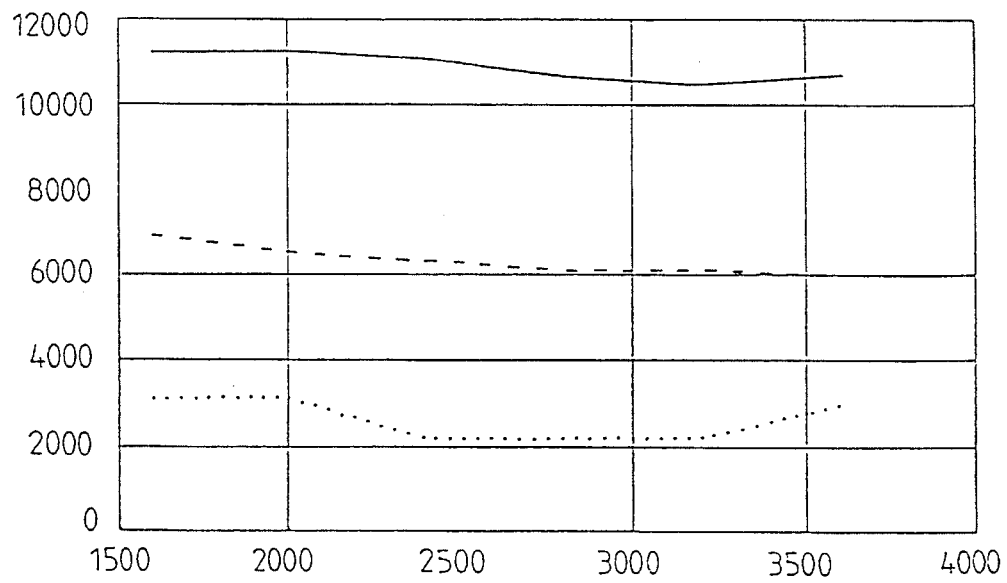
FIG. 8 shows the hydrocarbon (HC) content measured without load on a ppm scale vs. the number of revolutions per minute (rpm) of the engine. It can be seen from FIG. 8 that the HC content decreases to less than half in the absence of additional air supply as compared with the case of additional air supply.
Figure 9:
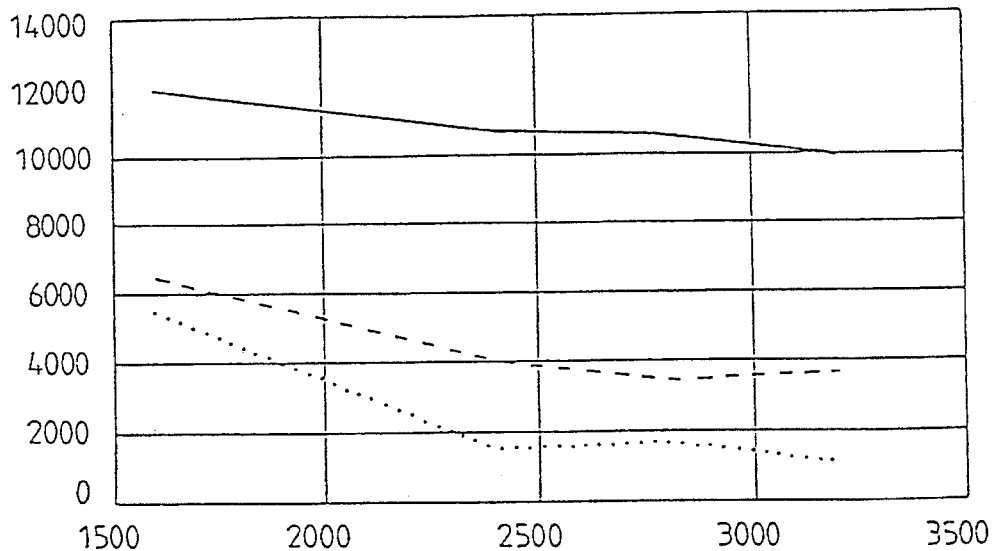
FIG. 9 shows the hydrocarbon (HC) content measured with load on a ppm scale vs. the number of revolutions per minute (rpm) of the engine. It can be seen from FIG. 9 that the HC content decreases to less than one third in the absence of additional air supply as compared with the case of additional air supply.
Figure 10:
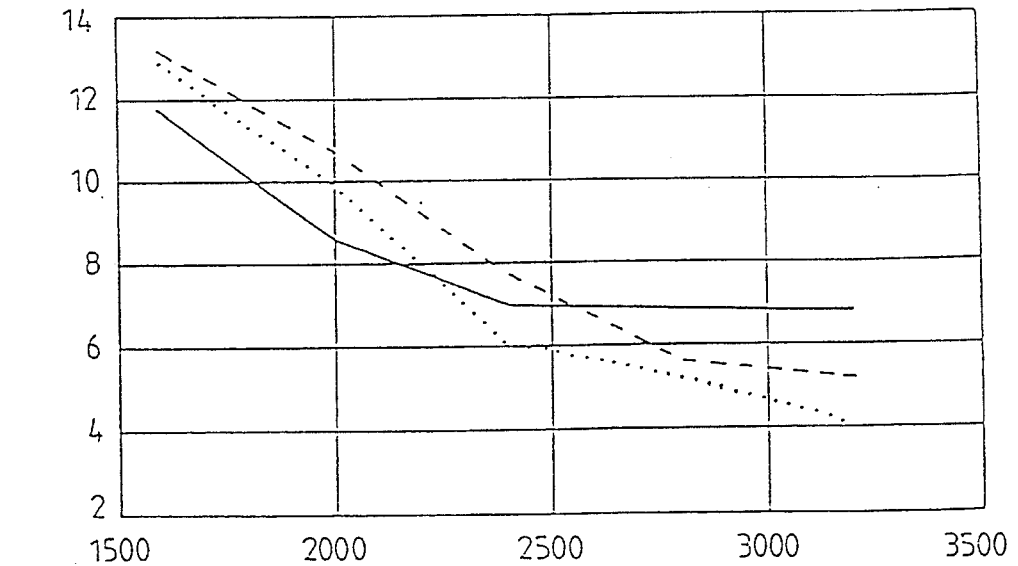

FIG. 10 shows the carbon monoxide content vs. the number of revolutions per minute measured with full load. In FIG. 10 at the high number of revolutions per minute, i.e. of the order in excess of 2600 rpm, the uppermost graph represents the exhaust gas from the engines, measured at the measuring point H shown in FIG. 1. The middle and lowermost graphs represent the purified exhaust gas, measured at the measuring point J shown in FIG. 1. The middle graph represents the case with no additional air supply and the lowermost graph the case of additional air supply. FIG. 10 shows how the additional air supply decreases the carbon monoxide content, especially at high numbers of revolutions per minute, i.e. of the order of 3000 rpm. It should be noted that small engines are often used at almost maximum speed of rotation.

Although the invention has been described above with reference to the examples according to the accompanying drawings, it is clear that the invention is not limited to them, but it can be varied in many ways within the scope of the inventive idea disclosed in the enclosed claims.

We claim:

1. In a catalytic combustion engine exhaust gas purifier with additional air supply having a housing structure accommodating an exhaust gas inlet, at least one catalyst element, laminarizing means for laminarizing flow of the exhaust gas in first direction, means for dividing the housing structure into several chambers, and an exhaust gas outlet, the improvement comprising:

means for supplying additional air into the housing structure in a second flow direction, and at least one suction plate in the housing structure after the laminarizing means in the first direction of the exhaust gas flow and in the vicinity of the means for supplying the additional air, the suction plate having an exhaust gas port and an additional air port, and being arranged across the first and second directions of the exhaust gas and additional air flows so that the additional air is sucked through the additional air port and from the suction plate into the exhaust gas flow through the exhaust gas port.

2. The exhaust gas purifier according to claim 1, wherein the additional air port is spaced radially from the exhaust gas port.

3. The exhaust gas purifier according to claim 1, and further comprising further additional air port in a successive suction plate in the first flow direction is in a position dissimilar to that of the air port first mentioned.

4. The exhaust gas purifier according to claim 1, and further comprising successive suction plates in the first direction, wherein sizes of exhaust gas ports of the successive suction plates increase in the first flow direction.

5. The exhaust gas purifier according to claim 1, and further comprising successive suction plates in the first direction wherein lengths of edges of exhaust gas ports in the successive suction plates increase.

6. The exhaust gas purifier according to claim 1, wherein the means for supplying additional air comprises a flow space at a surface of the housing structure.

7. In a catalytic combustion engine exhaust gas purifier having a housing accommodating an inlet for exhaust gas, a catalyst element for receiving the exhaust gas from the inlet, laminarizing means for laminarizing a flow of the exhaust gas from the catalyst element in a first direction, and an outlet for the exhaust gas, the improvement comprising:

air-supply means for supplying air into the housing; and suction means comprising a suction plate extending in the housing across the first flow direction and having an exhaust gas port for passing the laminarized flow of the exhaust gas in the first direction substantially unimpeded and an air port radially spaced from the exhaust gas port for at least some of the air to be sucked through the air port into the exhaust gas.

* * * * *